US006665836B1

(12) United States Patent
Wynblatt et al.

(10) Patent No.: US 6,665,836 B1
(45) Date of Patent: Dec. 16, 2003

(54) METHOD FOR MANAGING INFORMATION ON AN INFORMATION NET

(75) Inventors: Michael J. Wynblatt, Plainsboro, NJ (US); Daniel C. Benson, Seattle, WA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/098,649

(22) Filed: Jun. 17, 1998

(51) Int. Cl.[7] .............................................. G06F 15/00
(52) U.S. Cl. .................... 715/501.1; 715/513; 715/531; 707/1
(58) Field of Search .................... 707/513, 501, 707/104, 1; 345/118, 133, 127; 715/501.1, 513

(56) References Cited

U.S. PATENT DOCUMENTS

| | | | | |
|---|---|---|---|---|
| 5,579,471 A | * | 11/1996 | Barber et al. ................ | 395/326 |
| 5,598,557 A | * | 1/1997 | Doner et al. .................... | 707/5 |
| 5,793,966 A | * | 8/1998 | Amstein et al. ........ | 395/200.33 |
| 5,870,552 A | * | 2/1999 | Dozier et al. .......... | 395/200.49 |
| 5,884,056 A | * | 3/1999 | Steele ......................... | 395/339 |
| 5,899,999 A | * | 5/1999 | De Bonet ................... | 707/104 |
| 5,933,841 A | * | 8/1999 | Schumacher et al. ........ | 707/501 |
| 5,945,982 A | * | 8/1999 | Higashio et al. ............ | 345/203 |
| 5,956,726 A | * | 9/1999 | Aoyama et al. ............ | 707/102 |
| 5,958,008 A | * | 9/1999 | Pogrebisky .................. | 709/223 |
| 5,973,692 A | * | 10/1999 | Knowlton et al. .......... | 345/348 |
| 5,983,176 A | * | 11/1999 | Hoffert et al. .............. | 704/233 |
| 5,991,713 A | * | 11/1999 | Unger et al. .................... | 704/9 |
| 6,003,046 A | * | 12/1999 | Nielsen ....................... | 707/513 |
| 6,006,226 A | * | 12/1999 | Cullen et al. .................. | 707/6 |
| 6,018,710 A | * | 1/2000 | Wynblatt et al. ............ | 704/260 |

OTHER PUBLICATIONS

"Constructing Literature Abstracts by Computer: Techniques and Prospects," C. Paice, Information Processing and Management, 26:171–186, 1990.

"Visualizing the World–Wide Web with the Navigational View Builder", Mukherjea et al., Technical Report #95–09 of the Graphics, Visualization and Usability Center, Georgia Institute of Technology, 1995.

"Structured Visualization of Search Results", U. Preiser, Data Highways and Information Flooding, a Challenge for Classification and Data Analysis, Proceedings of the 21st Annual Conf. of the Gessellschaft fuer Klassifikation e.V., pp. 277–284.

"Drive Search Engine Traffic To Your Site", Ross et al., Avatar Online Magazine, Hyperlink, http://www.avatarmag.com/columns/sitemanage/default.htm, Feb. 1997.

"Identification and ratings of caricatures: Implications for mental representations of faces", Rhodes et al., \ Cognitive Psychology, 19(4), 1987, pp. 473–497.

"Perception and recognition of photographic quality caricatures: Implications for the recognition of natural images", Benson et al., European Journal of Cognitive Psychology, 3(1), 1991, pp. 105–135.

(List continued on next page.)

Primary Examiner—Stephen S. Hong
Assistant Examiner—Cong-Lac Huynh
(74) Attorney, Agent, or Firm—Donald B. Paschburg; F. Chau & Associates, LLP

(57) ABSTRACT

A method for managing document information on an information net, such as the World Wide Web (WWW), comprises the steps of inputting a structured document; extracting selected document properties from the structured document; forming a feature vector representative of the properties; and forming a caricature derived from the feature vector.

14 Claims, 12 Drawing Sheets

OTHER PUBLICATIONS

"Silk from a Sow's Ear: Extracting Usable Structures from the Web", Pirolli et al., Conference on Human Factors in Computing Systems, Apr. 1996.

"The Harvest Information Discovery and Access System", Bowman et al., Computer Networks and ISDN Systems, No. 28, 1995, pp. 119–125.

"Info–Plaza: A Social Information Filtering System for the World Wide Web", Hiraiwa et al., Proceedings of the International Conference on Parallel and Distributed Systems, Jun. 3, 1996, pp. 10–15.

"Visualizing Search Results: Some Alternatives to Query–Document Similarity", Nowell et al., Proceedings of the 19th Annual Int'l ACM Sigir Conf. on Research and Development in Info. Retreival, Zurich, Aug. 18–22, 1996, pp. 67–75.

"Method for Providing a Summary for Web Page Links", Anonymous, IBM Technical Disclosure Bulletin, vol. 41, No. 1, pp. 185–186.

"Visualizing The World–Wide Web With the Navigational View Builder", Mukherjea et al., Computer Networks and ISDN Systems, vol. 27, Jan. 1, 1995, pp. 1075–1087.

"Silk From A Sow's Ear: Extracting Usable Structures from the Web", Common Ground. Chi '96 Conference Proceedings, Conf. on Human Factors in Computing Systems, Vancouver, Apr. 13–18, 1996, pp. 118–125.

"Web Page Caricatures: Multimedia Summaries for WWW Documents" Wynblatt et al., Proc. IEEE Int. Conf. on Multimedia Computing and Systems, Jun. 28–Jul. 1, 1998, pp. 194–199.

* cited by examiner

FIG. 6

| HEURISTIC | CORRELATION |
|---|---|
| NUMBER OF LINKS | 0.45 |
| LINKS PER KB TEXT | 0.70 |
| % TEXT IN ANCHORS | 0.73 |
| % TEXT IN ANCHORS, EXTENDED TO INCLUDE TEXTLESS ANCHORS | 0.85 |

FIG. 7

| FEATURE | INTUITION |
|---|---|
| IMAGE SIZE | LARGE IMAGES ARE MORE RELEVANT |
| IMAGE ASPECT RATIO | NARROW IMAGES ARE LESS RELEVANT |
| NUMBER OF OCCURENCES OF IMAGE | FREQUENT IMAGES ARE OFTEN ORNAMENTAL OR STRUCTURAL |
| IMAGE IS A LINK ANCHOR | ANCHORS ARE OFTEN "BUTTON" BITMAPS OR ARE MORE REPRESENTATIVE OF TARGET DOCUMENT |
| IMAGE HAS "IMAGE MAP" | AS WITH ANCHORS |
| POSITION OF IMAGE WITHIN DOCUMENT | FIRST HALF OF DOCUMENT MORE LIKELY TO HAVE A RELEVANT IMAGE |
| IMAGE IS WITHIN A LIST | LISTS ARE OFTEN SUB-POINTS |

FIG. 11

| FEATURE | REPRESENTATION |
|---|---|
| TITLE | TEXT AT TOP OF CARICATURE, ANCHOR FOR URL |
| URL | NOT SHOWN, BUT USED AS TARGET OF TITLE HYPERLINK |
| DOCUMENT SIZE | WARNING ICON SHOWN IF SIZE ABOVE THRESHOLD |
| LINK DENSITY | BACKGROUND COLOR OF CARICATURE |
| REPRESENTATIVE IMAGE | SCALED AND RENDERED, TOP MIDDLE |
| NUMBER OF LARGE IMAGES | SHOWN BY SIZE OF RED BAR WITH SCALE |
| NUMBER OF SMALL IMAGES | SHOWN BY SIZE OF ORANGE BAR ON TOP OF RED BAR |
| PRESENCE OF E-MAIL LINK | MAILBOX ICON SHOWN IF PRESENT |
| DOCUMENT SUMMARY | LISTED AT BOTTOM |
| LAST MODIFICATION DATE | CLOCK ICON SHOWN IF PAGE HAS BEEN MODIFIED WITHIN A WEEK. ALARMING CLOCK (BLINKING) ICON SHOWN IF IT HAS BEEN MODIFIED WITHIN 2 DAYS |

METHOD FOR MANAGING INFORMATION ON AN INFORMATION NET

The World Wide Web (WWW) contains a vast amount of information which is generally not indexed. As is well-known, a user seeking specific information on the WWW is faced with a problem in trying to locate such information efficiently. In many cases, this leads to a sub-problem for a user who needs to select one or more documents from a finite set of documents. Typically, this problem is encountered when a user must choose from among the many results returned by a search engine query.

Examples of other sets of documents encountered include: the set of documents gathered by an agent; the set of documents accessible through links from the current document; a user's set of bookmarked documents; and the various forms of a navigation history list. An aspect of the present invention is to provide a representation of a structured document that can be easily scanned, so that when presented with a number of links to documents, a user can more quickly select the relevant documents of interest without being forced to examine each one.

Such sets of document links are typically presented as lists of document titles, sometimes with additional information such as a text summary or a date, as well as a hyperlink to the subject document. A typical example is shown in FIG. 1, which gives partial results of a query on the Alta Vista search engine on the keyword "snowboarding". The summarized information is useful, especially if the pre-selection of the documents in the group is accurate. Unfortunately, it is a cumbersome format, for it requires the user to read through a lot of text in order to determine which are the relevant documents. Sets of the kind described above often contain dozens, sometimes hundreds of documents, so that reading all such passages is generally impracticable, requiring unreasonable expenditure of time and effort. Moreover, since WWW document titles do not always reveal of the nature of the contents, the user may be forced to retrieve and evaluate a large number of documents for more detailed perusal in order to determine which pages are useful.

Related research has been conducted in the fields of information visualization and document summarizing. Work in document summarization attempts to abstract the essence of a document through text-based semantic analysis. See, for example, Paice, C. Constructing Literature Abstracts by Computer: Techniques and Prospects. Information Processing and Management, 26:171–186, 1990. The goal is usually to output a text display, and when applied to the WWW, this gives results much like those of the search engines: too dense to scan quickly.

Work in information visualization has provided a visual abstraction to the results of semantic analysis. See, for example, Mukherjea, S., and Foley, J. Visualizing the World-Wide Web with the Navigational View Builder. Technical Report #95-09 of the Graphics, Visualization and Usability Center, Georgia Institute of Technology, 1995 and Preiser, U., Structured Visualization of Search Results, To appear in: Data Highways and Information Flooding, a Challenge for Classification and Data Analysis, Proceedings of the 21st Annual Conference of the Gesellschaft fuer Klassifikation e.V.

However, such systems have generally provided abstractions which are quite sophisticated and difficult for an untrained user to interpret. In this respect, they do not provide much improvement over text-based systems for quick scanning. Both types of systems are based mainly on free-text analysis for their semantic distillation. Unfortunately, free-text analysis often requires some domain-knowledge in order to provide useful results. The WWW offers such a diverse collection of documents, that such domain-knowledge generally cannot be assumed on the part of a user.

Some approaches require the Web document author to include additional meta-information on their pages. While this technique can allow very specific information about a page's contents to be obtained immediately and without error, it has the drawback of relying heavily on the author's perception of what is needed, and the author may not have the same goals as the Web user. Another problem is that an author may not invest the effort to include all of the document's meta information, especially if several systems require different meta information.

It is herein recognized that only a small fraction of Web documents currently contain complete meta-data, and other pages are completely opaque to meta-data reliant systems. Furthermore, some authors may include arguably incorrect meta-information which may be primarily intended to attract readers to their document rather than to accurately represent the document's content. It is herein recognized that the expanding commercial nature of the WWW, is likely to increase the motivation for such information being entered. See, for example, Ross, E., Drive Search Engine Traffic To Your Site, Avatar Online Magazine, HYPERLINK http://www.avatarmag.com/columns/sitemanage/default.htm http://www.avatarmag.com/columns/sitemanage/default.htm__, February 1997.

In accordance with the principles of the present invention, simple visual cues like shape, color and icons are used to represent features which can be detected in a document syntactically. Combinations of well-recognized visual cues are utilized to make the system in accordance with the invention useful to an untrained user and by basing a semantic abstraction on syntactic features, the intractability of arbitrary text analysis is largely avoided, although the approach is complementary with such analysis. By not requiring any special web-page formatting like meta-tags, the system in accordance with the invention can be used universally on HTML WWW documents.

It is herein recognized that it may be helpful to a clearer understanding of the invention to liken an aspect of the system in accordance with the invention to caricature drawings which one might find, for example, as part of a political cartoon. In such a cartoon, the entire set of famous humans can be distinguished by a representation which varies only over a few dimensions or characteristics: the size and shape of eyes, ears, nose, head and hair. The capacity of the human brain to recognize patterns of visual information allows one to identify the lampooned character by the exaggerated representations of appurtenant basic features.

It is also herein recognized that in many cases, humans can recognize caricatures of people more easily than more precisely accurate drawings. See the so-called "caricature advantage" in, for example, Rhodes, G., Brennan, S., & Carey, S. Identification and ratings of caricatures: Implications for mental representations of faces. Cognitive Psychology, 19(4), 1987, 473–497 and Benson, P. J., & Perrett, D. I. Perception and recognition of photographic quality caricatures: Implications for the recognition of natural images. European Journal of Cognitive Psychology, 3(1), 1991, 105–135.

In accordance with an aspect of the invention, a method for managing document information on an information net, such as the World Wide Web (WWW), comprises the steps of inputting a structured document; extracting ye selected document properties from the structured document; forming a feature vector representative of the properties; and outputting the feature vector.

In accordance with another aspect of the invention, the method includes a step of forming a caricature derived from the feature vector.

In accordance with another aspect of the invention, the step of forming a caricature derived from the feature vector comprises: inputting a caricature template; utilizing the feature vector and the caricature template to map features of the structured document to visual representations; generating a caricature specification from the visual representations; rendering the caricature specification; and visually displaying the caricature specification.

In accordance with another aspect of the invention, the step of extracting selected document properties comprises extracting properties relating to media content data from the structured document.

In accordance with another aspect of the invention, the step of extracting selected document properties comprises a step of extracting a representative image from the structured document.

In accordance with another aspect of the invention, the step of extracting selected document properties comprises a step of extracting properties relating to link density from the structured document by determining the ratio of the number of text characters within hyperlink anchors and a weighted number of hyperlinks within images and maps to the total number of rendered text characters.

In accordance with another aspect of the invention, a method for managing document information on the World Wide Web (WWW), comprises the steps of: inputting a structured document; extracting selected document properties from the structured document, comprising any of: basic document properties, media content data, link density, document complexity, and a representative image from the structured document; forming a feature vector representative of the properties; inputting a caricature template, forming a caricature from the template and the feature vector; and visually displaying the caricature.

In accordance with another aspect of the invention, the caricature is displayed utilizing its attributes of sizes to represent one of the document properties.

In accordance with another aspect of the invention, the caricature is displayed utilizing its attributes of colors to represent one of the document properties.

In accordance with another aspect of the invention, the caricature is displayed utilizing its attributes of shapes to represent one of the document properties.

The invention will be more fully understood from the following description of the preferred embodiment, in conjunction with the Drawing, in which FIG. 1 shows a partial query result for the keyword "snowboarding" on a search engine, Alta Vista;

FIG. 6 shows a table of the correlation of automated link density heuristics to human-related results, in accordance with the present invention;

FIG. 7 shows a table of features used to determine representative images in accordance with the present invention;

FIG. 11 shows a table of an example of a caricature template in accordance with the invention;

In accordance with another aspect of the invention, basic features of a web page are characterized and, through exaggerated visual representation, this allows a quick analysis of the contents of the page. Features of a WWW document are able to be extracted using primarily syntactic analysis in accordance with an aspect of the invention and these features are useful in abstracting the document's content as will hereinafter be more fully explained. In accordance with another aspect of the invention, these features are be displayed in a caricature. Exemplary caricatures from a prototype WWW search result renderer will be disclosed.

In accordance with another aspect of the invention, a document abstraction is utilized for providing an easily perusable WWW document representation. The abstraction should preferably comprise a set of document features, so that a caricature can be developed as a representation of those features. It is desirable that the features extracted apply to all WWW documents (or at least most WWW documents), so that essentially all WWW documents can be described using the abstraction. It is further desirable that the features extracted show distinctions between documents, so that caricatures of two different documents do not look similar. In order to maintain a relatively low mischaracterization rate over a multi-domain environment, it is preferred to extract syntactic rather than content-based features where possible.

A particular set of features describing a document has been called a "feature vector" in work which concentrated on representing relationships between WWW documents and on document usage. See, for example, Pirolli, P., Pitkow, J., and Rao, R., Silk from a Sow's Ear: Extracting Usable Structures from the Web. Conference on Human Factors in Computing Systems, April 1996. The focus herein is on properties of individual documents, independent of their usage, and the term feature vector is herein used.

Figure 2:
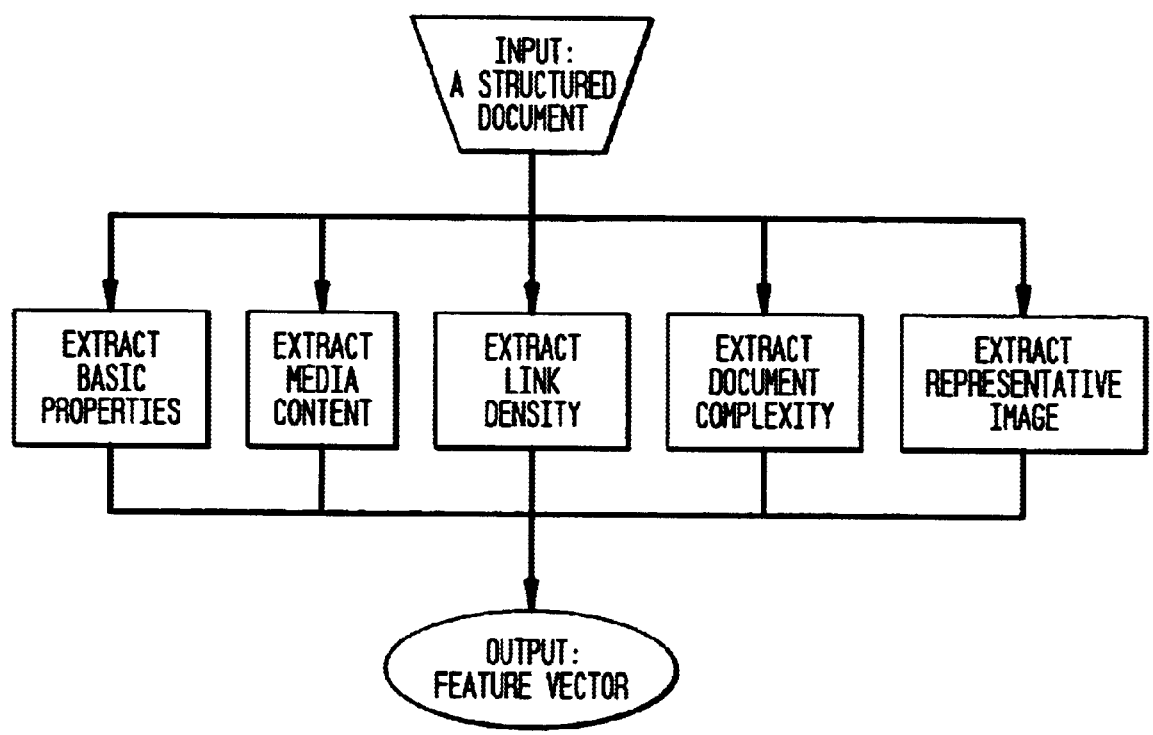
FIG. 2 shows a diagram of the creation of document feature vectors in accordance with the invention.

FIG. 2 shows in diagrammatic form a suitable process for the creation of Document Feature Vectors in accordance with the present invention.

Several properties of a WWW document are usually provided by WWW searching services, and are important in describing the document. The title of a page is often a useful, concise statement of the document contents, although it is rarely sufficient. The last modification date of a document is useful for determining whether the information in the document is current. The URL or Uniform Resource Locator of a document is critical in allowing the document to be accessed, and may also be useful in illuminating the source of the document.

Many search engines also offer a document abstract. Simple techniques for generating abstracts include choosing the first N words of the document, choosing the first N words from headers in the document, or choosing the first sentence containing the keyword on which the document was searched. More sophisticated document summarizing techniques are described in the above-referenced work by Paice, C., Constructing Literature Abstracts by Computer: Techniques and Prospects. Information Processing and Management, 26:171–186, 1990.

Another important property to a browsing user is the size of a page, in bytes. The size is important because it is a major factor in the retrieval latency of the document, and it is also the most easily measured factors in latency. Unfortunately, most engines currently give the size only of the HTML or HyperText Transport Protocol file which is denoted by the URL, and do not include the much more significant sizes of the embedded media. Pages which include many graphics, large graphics, high resolution graphics, applets, or sound files may take an excessive amount of time to load. Under certain conditions the user may wish to avoid such pages, or set the browser into a mode which will suppress downloading of media. Therefore, a description of document size must include embedded media in order to be complete.

During some interactions a user may wish to contact the publisher of a page. It can be useful in such cases to know whether or not there is an e-mail link on any given page. Whether or not such an e-mail link exists can be part of the feature vector.

One interesting quality of the WWW is that there seem to be almost as many "index" documents, with pointers to content, as there are pages with actual content. Index pages can be extremely useful such as when a user is beginning an investigation, but index pages are much less useful when the user requires specific information, especially when the indexes seem to point only to additional indexes. It is useful, therefore, to know whether a document is primarily an index or primarily information. It is herein recognized that, in fact, most documents fall somewhere in between, along a continuum of "indexness".

Figure 3:
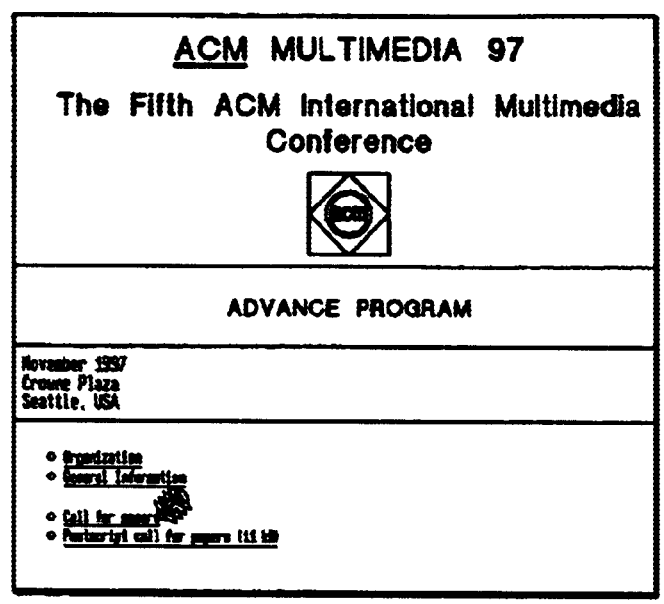
FIG. 3 shows an example of an index page, helpful to an understanding of the invention.

There are several ways in which one can measure this property, hereinafter referred to as the link density of a document. A simple way is to count the absolute number of links contained in a document. This method is problematic because it may unfairly characterize long, mostly-content documents, or documents which contain mainly content but have been diligently hyperlinked by the author. An alternative measure is to count the number of links per unit of text, for example, links per kilobyte of text. Again, this may mischaracterize documents which are mainly content, but which have been diligently hyperlinked to related information. FIG. 3 shows an example of this kind of document, which is preferably not considered an index.

Figure 4:
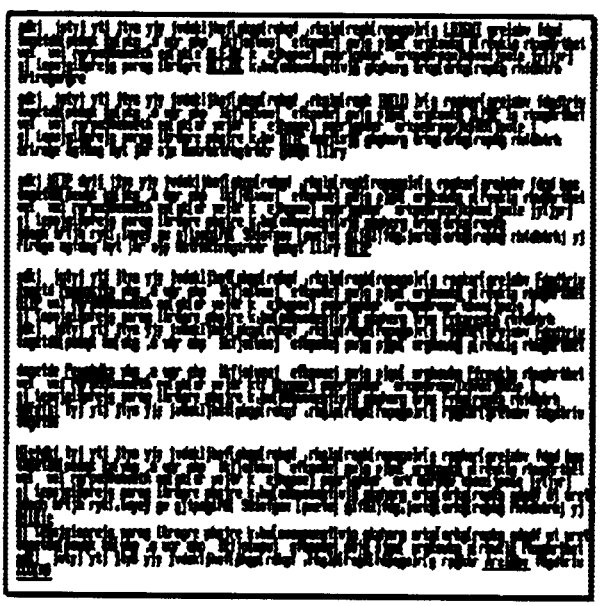
FIG. 4 shows an example of the kind of document which is mainly content, but which has been diligently hyperlinked to related information.

Another way to formulate the problem is to ask whether or not most of the information in the document consists of links to other documents. An approach which matches this goal somewhat better is to calculate the number of characters in the document which are contained within link anchors, as a percentage of the total number of characters. In documents such as the one shown in FIG. 3, usually only single words, or small groups of words are hyperlinked, leaving a fair amount of text outside of anchors, while documents like that shown in FIG. 4 usually have a lower proportion of additional text.

Figure 5:
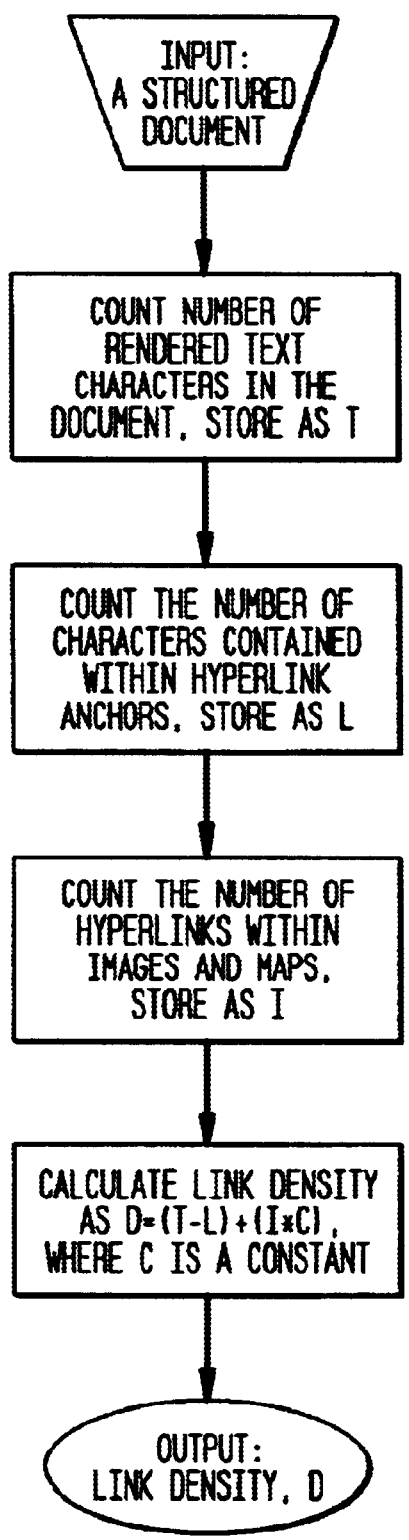
FIG. 5 shows a flow chart of an example of the extraction of Link Density in accordance with the invention.

A final concern is that hyperlinks are sometimes anchored on bitmaps, rather than text, and thus are not counted towards the link density in the heuristic just described. Such links can be taken into account by counting them as "C characters", both toward the number of characters within anchors, and toward the total number of characters, where the value of C can be determined empirically. Client-side image maps containing I links count as I*C characters. FIG. 5 shows in flow chart form a suitable process for deriving Link Density in accordance with the present invention.

As an empirical example, given a set of 51 documents, being real WWW pages, several humans were asked to categorize them along a continuum describing whether the document contained more index or more content. Four heuristics based on the ones described above were then applied to the same set of documents, and the documents were ranked by each resulting metric. Each ranking was then compared to the average of the human rankings, and a Spearman ranking correlation determined. The results are shown in the table in FIG. 6. The final heuristic is highly correlated with human-rated results, and notably more so than the simpler methods.

Another feature of WWW documents which it can be useful to know is the media content: how many images or animations or audio clips are in a document. A media content profile provides a descriptive characterization of the type of information which the document may convey. Graphics-intensive pages may indicate more commercial documents, on-line catalogs may be categorized by the presence of images or audio, and media content may indicate documents which may be more or less suitable for rendering in particular environments. In some cases, a user may be specifically searching for a particular media type, in which case the media characterization is critical.

One distinction which was found useful to draw is between images which are actually conveying information, and images which are simply ornaments of the page structure, such as dividing bars, fancy list bullets, and simple link icons. To this end, images are counted in two separate categories, those which were greater than P pixels in each dimension and those that were not. Experiments have shown that 20 is a reasonable value for P in drawing the distinction. The feature vector of the document then contained the number of each kind of image separately, and in this way, pages with a lot of ornamentation could be distinguished from pages with a lot of image content that is more likely to be useful in categorization. In accordance with a preferred embodiment of the present invention, a choice was made not to count an image at all if it is less than 10 pixels in either dimension, as such images are nearly always section dividers and not of much use in characterizing a document's contents. The number of image maps is also included as part of the feature vector.

The amount of programming and structural information which the document includes is a useful measure of the complexity of the document. A large amount of complexity can result from extensive HTML formatting or scripting. Like the media content, the complexity of a document helps a user to gauge what to expect from a document. A highly complex document might indicate a more professionally designed page, a more commercially oriented page, a page with emphasis on form over content, or a page which will be taxing on an unsophisticated browser. In accordance with the principles of the present invention, a document's complexity is measured relative to the amount of actual content, so as to avoid characterizing long documents as complex. The preferred metric is to simply count the number of characters in a WWW document which are actually rendered, as a proportion of the total number of characters in the document which, in a simple ASCII document, is also the size of the document in bytes. The resulting value is the inverse of the document complexity.

One way to quickly characterize a WWW document visually is to display an image from that document which is representative of that document's content. For this reason, in accordance with the present invention, a representative image is included in the document feature vector, that is, a bitmapped image from the document which expresses something about the content and nature of the document.

Automatically choosing a highly representative image from a set of available images is far from an exact measurement. The state-of-the-art of automated image analysis does not permit much content analysis at all, let alone subjective evaluation. Moreover, some documents contain only images which are structural or ornamental, and thus none of the choices may be appropriate. Other documents may contain several images which subjectively seem to be of equal value. Given these constraints, syntactically-based heuristics have been utilized in accordance with the present invention to choose a representative image with surprising accuracy. This is aided by the fact that choosing the second- or third-best image is often good enough to convey useful information, and so that the task is essentially to select a representative image, rather than the truly representative image.

Figure 8:
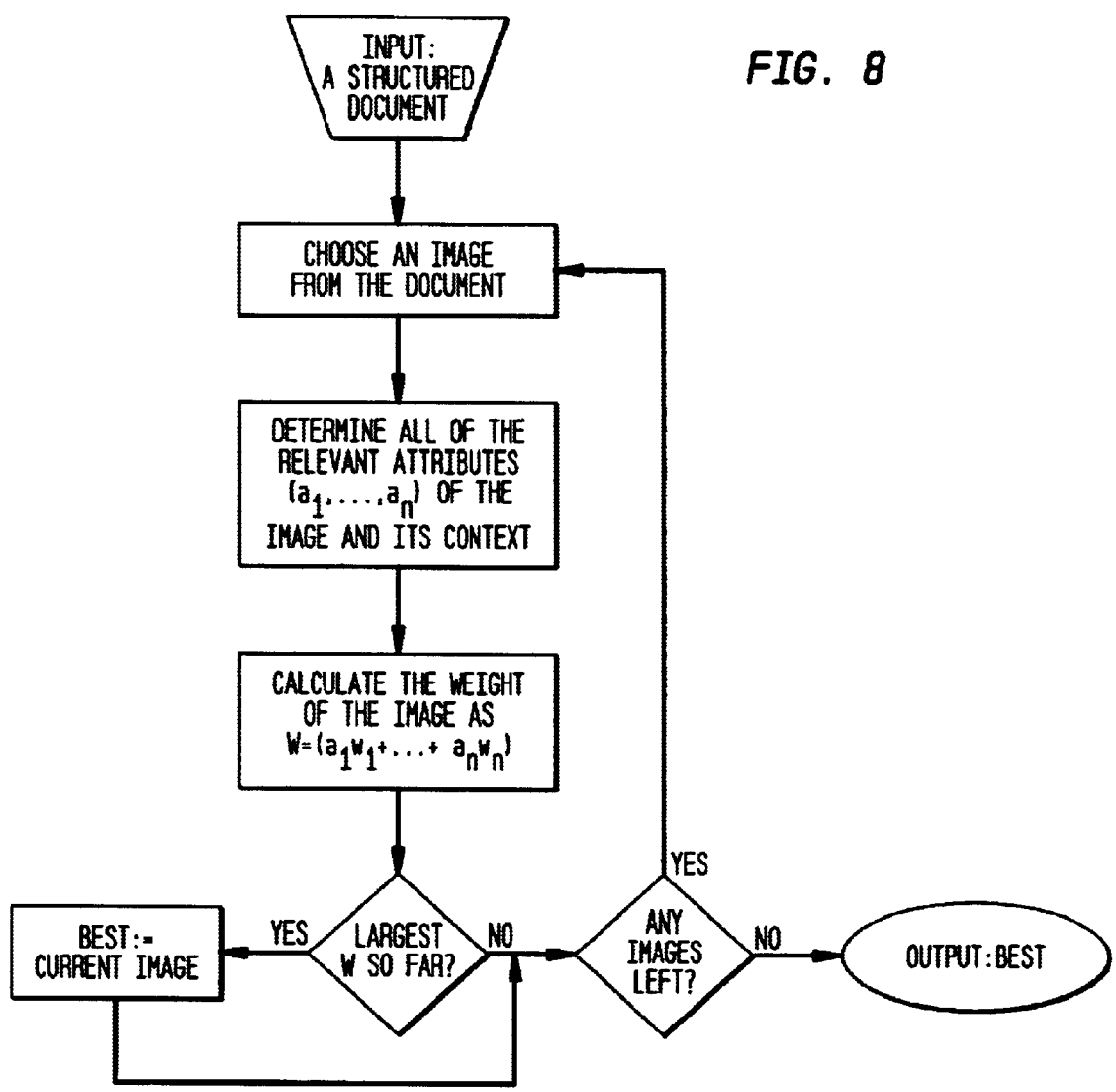
FIG. 8 shows a flow chart of the extraction of a representative image in accordance with of the present invention.

A strategy in accordance with the present invention for determining a representative image from the set of images displayed in the document is to assign a score to each image based on features which are indicative of the image's relevancy. Some features indicate that the image is less likely to be representative of the document, and those features are associated with a negative weight. Other features indicate that the image is more likely to be representative, and they are assigned a positive weight. The weights for each image are summed, and the image with the greatest total score is chosen as the representative image. A neural net program trained with human rated pages was used to optimize the weights for a linear formula. The neural net was single level, with linear weighting on the inputs, each input representing one of the features in FIG. 7. Feedback from the training was used in the traditional iterative manner to optimize the weights. The table in FIG. 7 summarizes the features, and gives some intuition as to why each feature is relevant in practice. FIG. 8 shows in flow chart form a suitable process for extracting a representative image in accordance with the present invention.

Figure 9:
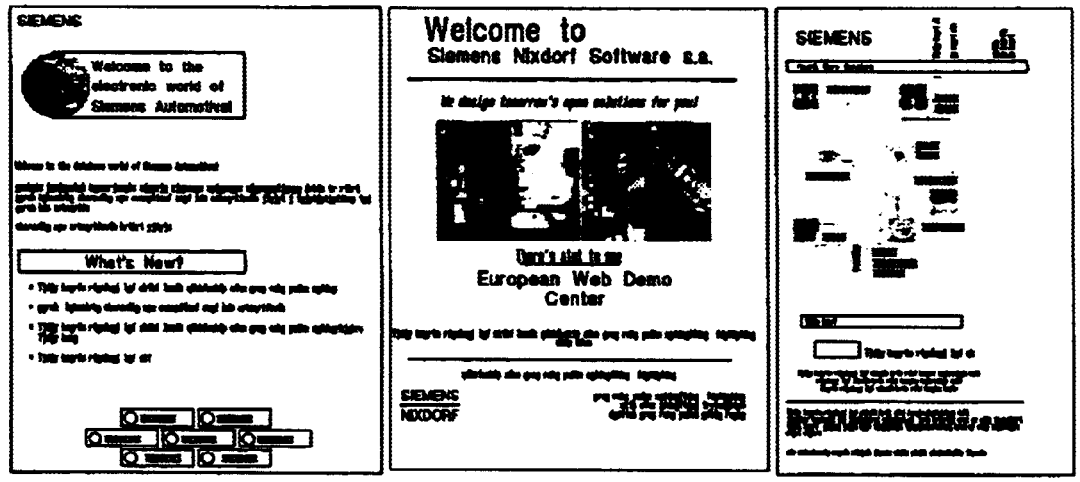
FIG. 9 shows three WWW documents.
Figure 10:
FIG. 10 shows the representative images of the documents in FIG. 9 according to a weighted linear formula determined by a neural net in accordance with the present invention.

FIG. 9 shows some WWW documents, and FIG. 10 shows the representative images which were chosen using afore-mentioned linear weights. In the leftmost document, the largest and clearly best image is chosen. In the center document, the formula "recognizes" that the largest image is actually a menu of other pages, and correctly identifies the title banner as most indicative of the document itself In the rightmost document, no image is particularly representative of the document, and the formula identifies a reasonable one given the available choices.

Once a feature vector has been defined for WWW documents, a subsequent task is to provide a visual representation of the vector through which the various features can be quickly communicated to a user. A simple solution is simply to list the attributes. This offers relatively little improvement over current systems: the user must still read a large amount of text to choose a document from a group. In accordance with invention, a better solution is to employ properties such as color, which a user can identify quickly from a group of heterogeneous values. The list of such properties which are available is herein referred to as the representation space, and each caricature template is a mapping from the feature vector to the representation space.

Some of the basic properties of the representation space include color, shape, size, texture, number, and audio characteristics. One way to represent an element of the feature vector is to vary one of these properties along a continuum in correspondence to the value of the feature. For example, the size of a caricature might vary according to the size of a web page. The trouble with representing all features using such basic properties is that in order to recognize a collection of desired features a user must process all of these different properties at once, which can be quite taxing. Another problem is that some properties are not very practical. For example, if the size of caricature is varied to represent a feature, it can quickly become too small to recognize other properties, or too large to permit many caricatures to be displayed together.

Another way to represent a feature is through a symbol or icon. This is particularly useful for Boolean features such as the presence or absence of an e-mail link; a representative symbol can either be present or not depending on the Boolean value of the feature. Users searching for a particular symbol can find it fairly easily as long as the number of possible symbols is small.

Symbolic representation can be used in conjunction with basic property representation by allowing the basic properties symbols to vary with the value of the feature they represent. For example, if an icon of a picture frame is used to denote documents which include images, then the size of the picture frame might vary based on the number of images in the document.

Finally, some features may have a traditional representation based on their media type. For example, a document's representative image is probably best displayed as a bitmap (although the size of the bitmap may vary). Keywords from a document might be displayed as complex relationships between caricatures denoting the relative prominence of the keywords, but for many users probably they are most usefully displayed just as text.

The table shown in FIG. 11 shows an example of a caricature template implemented in accordance with the principles of the present invention.

Figure 12:
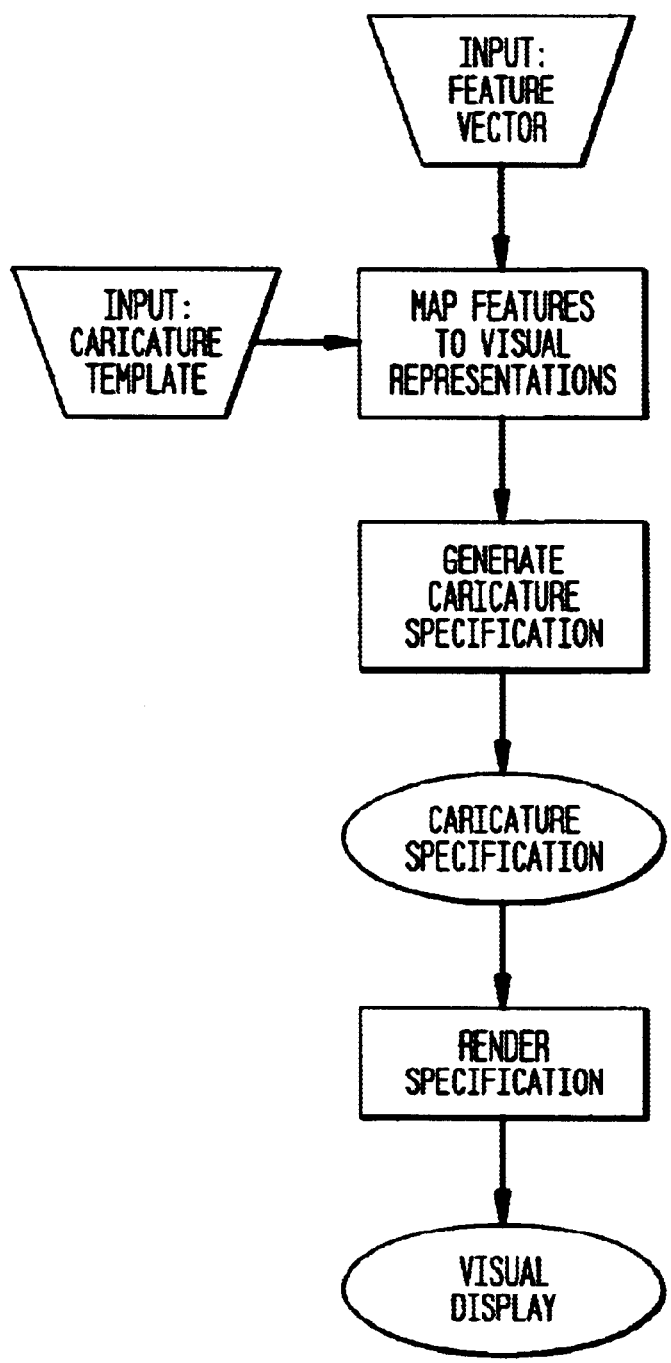
FIG. 12 shows an example of a process for deriving a visual display in accordance with the invention.

FIG. 12 shows in flow chart form a suitable derivation for a Caricature Display in accordance with the present invention.

Figure 13:
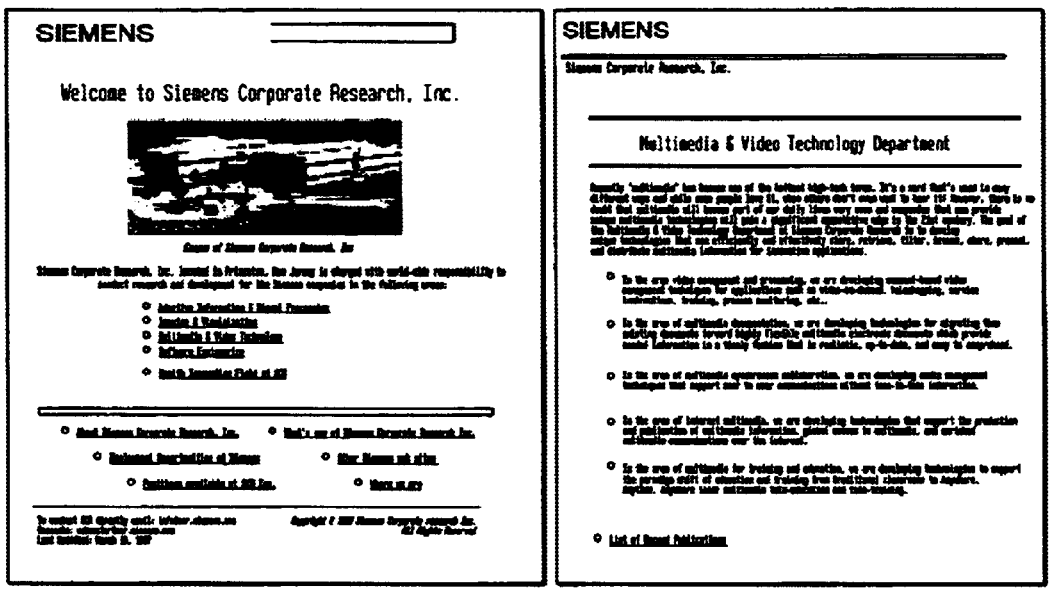
FIG. 13 shows two representative WWW documents.
Figure 14:
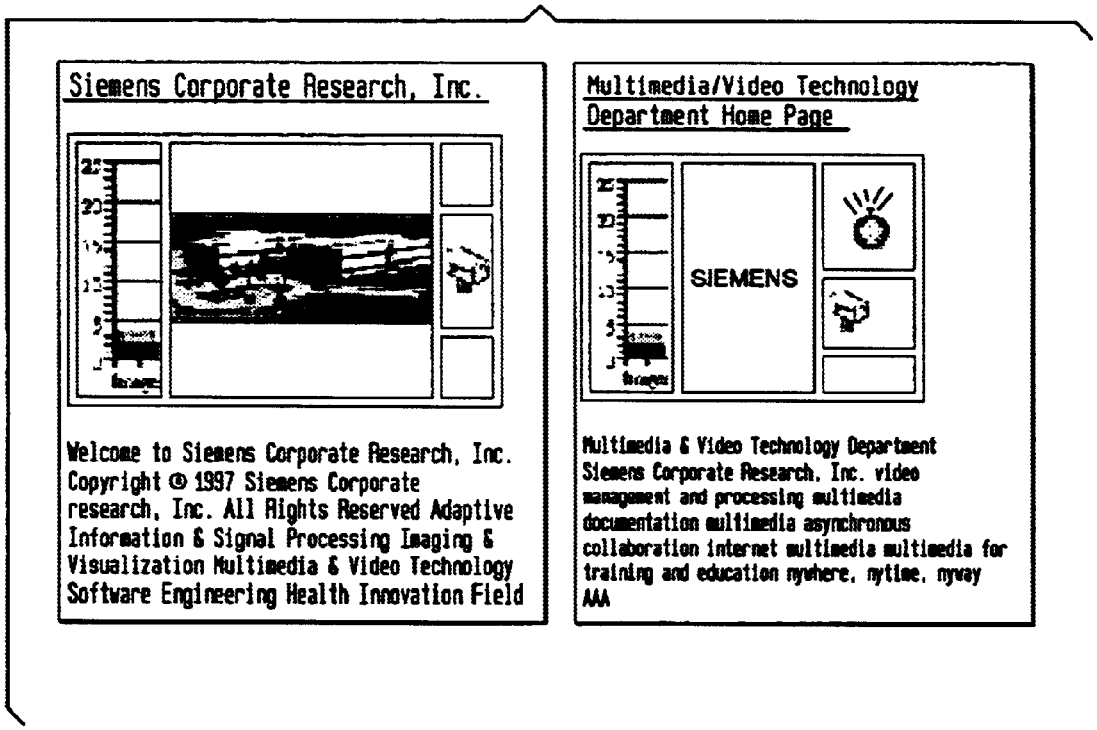
FIG. 14 shows the WWW Caricatures of the documents in FIG. 13, derived in accordance with the principles of the present invention.

FIG. 13 shows two sample web documents, and FIG. 14 shows the caricatures generated for those documents by the system in accordance with the invention. As noted in FIG. 11, the background color of the caricature represents the link density, on this particular scale yellow represents a very low link density documents with (content, not index), with green in the middle, and with blue and finally purple representing a high link densities (mostly index documents). The first caricature shows the document title and an abstract, and also shows that the document has a small number of images, a high link density, an e-mail link, and does not have any other targeted properties. The second caricature shows that the second document has a high link density, a similar number of images to the first, an e-mail link (which is further down the page), and also contains a blinking clock indicating that the page has been very recently updated. Note that the "image thermometer" allows the number of images to be approximated at a glance, or read accurately if desired.

Figure 1:
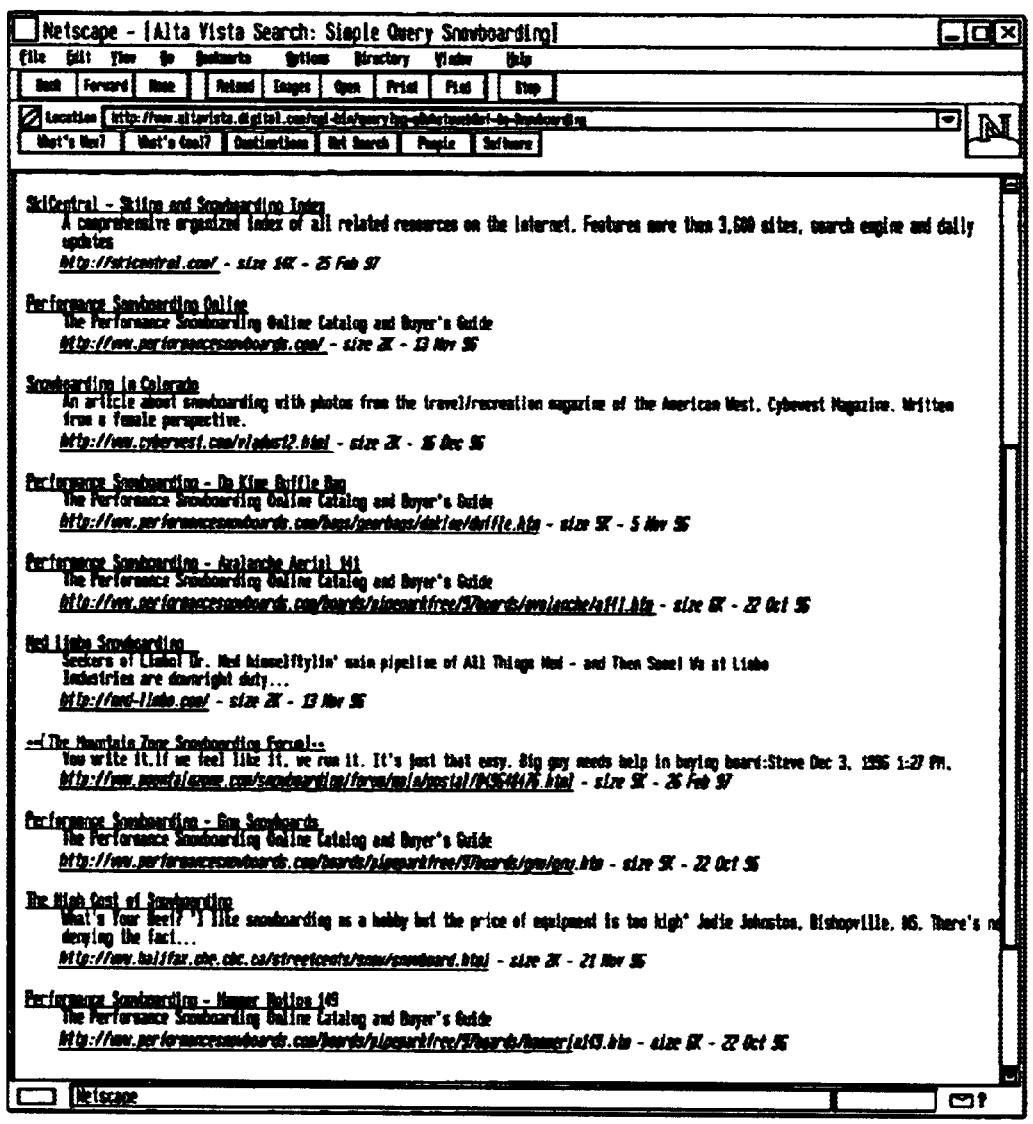
Figure 15:
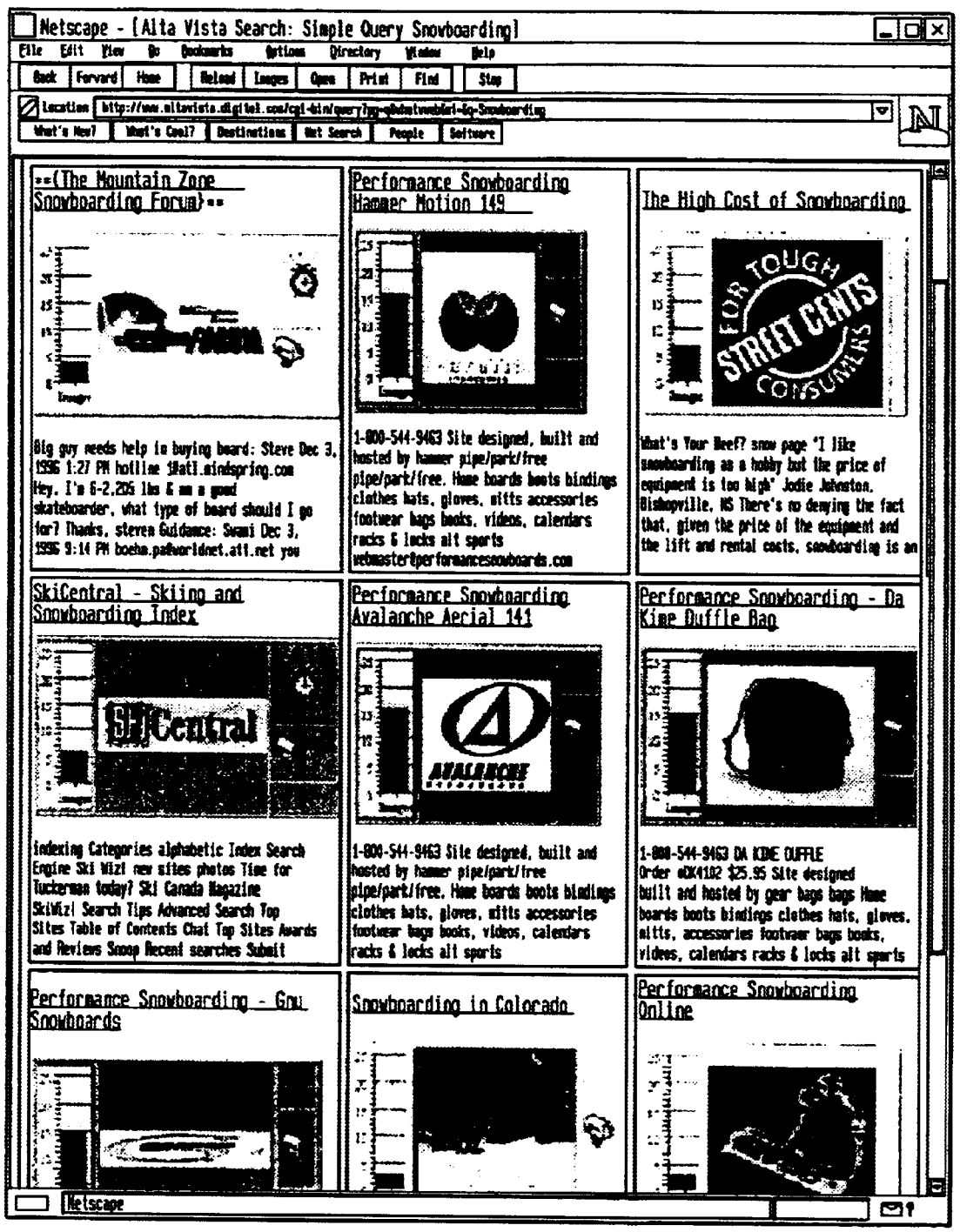
FIG. 15 shows a Caricature representation in accordance with the principles of the present invention of the result of a query for the keyword "snowboarding" from Alta Vista search engine.

FIG. 15 shows the template applied to the set of documents which were the first 10 retrieved from the Alta Vista search engine when queried on the search string "snowboarding". For comparison, FIG. 1 shows the same pages as described by Alta Vista itself. See Digital Equipment Corporation, The Alta Vista Search Engine. http://www.altavista.digital.com.

In accordance with a preferred embodiment of the present invention, a tool based on the Harvest system has been implemented. See Bowman, C., Danzig, P., Hardy, D., Manber, U., and Schwartz, M. The Harvest Information Discovery and Access System. Computer Networks and ISDN Systems, No. 28, 1995, pp. 119–125. Harvest is a tool which can access WWW sites and record information about what was found. The described embodiment in accordance with the invention uses Harvest to gather the information for feature vectors, and then makes them available as caricatures. Currently the system can extract information from HTML, GIF and JPEG files.

While it may not be readily apparent at first, the feature vector for the caricatures is not significantly larger than the text stored by a traditional index. Representative images are not stored locally, but rather the URLs of the images are stored. The rest of the graphical representation can be generated at run time from a template. Therefore, although the representation in accordance with the invention is much richer, it does not have additional storage concerns over those normally associated with text based applications.

While the invention has been described and explained by way of exemplary preferred embodiments, it will be understood by one of skill in the art to which it pertains that various changes and modifications may be made without departing from the spirit of the invention. For example, other WWW properties can be chosen to form a feature vector, and other caricature templates can be designed.

These and like changes are understood to be within the scope of the invention which is defined by the claims following.

What is claimed is:

1. A method for managing document information on an information net, comprising the steps of:
   (a) inputting a structured document;
   (b) extracting selected document properties from said structured document wherein said step of extracting selected document properties comprises a step of extracting properties relating to link density from said structured document by the steps of:
      (A) counting the number T of rendered text characters in said document,
      (B) counting the number L of hyperlink characters contained within hyperlink anchors in said document,
      (C) counting the number I of hyperlinks within images and maps in said document, and
      (D) calculating said link density D, wherein $D=(T-L)+(I*C)$, where C is a constant;
   (c) forming a feature vector representative of said properties; and
   (d) outputting said feature vector.

2. A method for managing document information in accordance with claim 1, including a step of forming a caricature derived from said feature vector.

3. A method for managing document information in accordance with claim 2, wherein said step of forming a caricature derived from said feature vector comprises:
   inputting a caricature template;
   utilizing said feature vector and said caricature template to map features of said structured document to visual representations;
   generating a caricature-specification from said visual representations;
   rendering said caricature specification; and
   visually displaying said caricature specification.

4. A method for managing document information in accordance with claim 1, wherein said step of extracting selected document properties comprises extracting basic document properties from said structured document.

5. A method for managing document information in accordance with claim 1, wherein said step of extracting selected document properties comprises extracting properties relating to media content data from said structured document.

6. A method for managing document information in accordance with claim 1, wherein said step of extracting selected document properties comprises a step of extracting properties relating to document complexity from said structured document.

7. A method for managing document information in accordance with claim 1, wherein said step of extracting selected document properties comprises a step of extracting a representative image from said structured document.

8. A method for managing document information in accordance with claim 7, wherein said representative image is not stored in local memory and its respective Uniform Resource Locator (URL) is stored in local memory.

9. A method for managing document information in accordance with claim 7, wherein said step of extracting a representative image from said structured document comprises the steps of:
   selecting an image from said structured document;
   determining relevant attributes $(a_1, \ldots a_n)$;
   allocating a weight to said image as $W=(a_1w_1+ \ldots +a_nw_n)$;
   comparing said weight of said image with weights allocated respectively to any other images heretofore selected from said structured document;
   if said image exhibits a larger W than any of said weights allocated respectively to any other images heretofore selected from said structured document, then designating said image as a Best Image in place of any image heretofore so designated as a Best Image;
   repeating the foregoing steps by selecting a further image from said structured document, until no images remain unselected in said structured document; and
   outputting the last image to be designated a Best Image.

10. A method for managing document information in accordance with claim 9, wherein said step of allocating a weight to said image is performed by a trained neural network.

11. A method for managing document information in accordance with claim 10, including a step of training said neural network by in accordance with operator preferences.

12. A method for managing document information on the World Wide Web (WWW), comprising the steps of:
   inputting a structured document derived from said WWW;
   extracting from said structured document data, including any of:
      (a) basic document properties,
      (b) media content data
      (c) link density data by counting the number T of rendered text characters in said document, counting the number L of hyperlink characters contained within hyperlink anchors in said document; counting the number I of hyperlinks within images and maps in said document; calculating said link density D, calculating $D=(T-L)+(I*C)$, where C is a constant;

(d) document complexity data from said structured document, and (e) a representative image from said structured document by the steps of: selecting an image from said structured document, determining relevant attributes $(a_1, \ldots a_n)$, allocating a weight to said image as $W=(a_1w_1+ \ldots +a_nw_n)$, comparing said weight of said image with weights allocated respectively to any other images heretofore selected from said structured document, if said image exhibits a larger W than any of said weights allocated respectively to any other images heretofore selected from said structured document, then designating said image as a Best Image in place of any image heretofore so designated as a Best Image, repeating the foregoing steps by selecting a further image from said structured document, until no images remain unselected in said structured document, and outputting the last image to be designated a Best Image, and forming a feature vector representative of said properties;

inputting a caricature template;

forming a caricature from said template and said feature vector; and outputting said caricature.

13. A method for managing document information in accordance with claim 12, including a step wherein data pertaining to audio data content in said structure document is extracted.

14. A method for managing document information in accordance with claim 13, including a step wherein data pertaining to audio data content in said structure document is utilized in forming said caricature from said template and said feature vector.

* * * * *